United States Patent [19]

Imura

[11] Patent Number: 4,914,673
[45] Date of Patent: Apr. 3, 1990

[54] RADIATION THERMOMETER
[75] Inventor: Kenji Imura, Osaka, Japan
[73] Assignee: Minolta Camera Kabushiki Kaisha, Osaka, Japan
[21] Appl. No.: 241,815
[22] Filed: Sep. 2, 1988

Related U.S. Application Data

[63] Continuation of Ser. No. 915,621, Oct. 6, 1986, abandoned.

[30] Foreign Application Priority Data

| Oct. 7, 1985 | [JP] | Japan | 60-223223 |
| Mar. 25, 1986 | [JP] | Japan | 61-66622 |
| Mar. 25, 1986 | [JP] | Japan | 61-66623 |

[51] Int. Cl.$^4$ .................. G01J 05/08; G01J 05/62
[52] U.S. Cl. .................. 374/130; 250/351; 350/269; 356/43
[58] Field of Search ............... 374/130; 356/43, 48; 250/232, 351; 310/332; 350/632

[56] References Cited

U.S. PATENT DOCUMENTS

| 2,000,948 | 5/1935 | Hayes | 250/232 X |
|---|---|---|---|
| 3,026,413 | 3/1962 | Taylor . | |
| 3,107,300 | 10/1963 | Stanley et al. | 250/232 X |
| 3,166,683 | 1/1965 | Gootherts | 310/332 |
| 3,293,915 | 12/1966 | Banca et al. . | |
| 3,586,439 | 6/1971 | McKibben et al. | 374/130 X |
| 3,938,258 | 2/1976 | Zook | 33/366 |
| 4,084,500 | 9/1977 | Moore | 250/351 X |
| 4,113,387 | 9/1978 | Shutt | 356/350 |
| 4,233,512 | 11/1980 | Rupert | 374/130 X |
| 4,237,399 | 12/1980 | Sakamoto | 310/332 X |
| 4,300,047 | 11/1981 | Fujii et al. . | |
| 4,498,765 | 2/1985 | Herve | 356/43 |
| 4,589,782 | 5/1986 | Park | 374/14 |
| 4,631,406 | 12/1986 | Nakata | 250/351 X |
| 4,654,553 | 3/1987 | Sato et al. | 310/332 X |
| 4,663,555 | 5/1987 | Yoshihiro | 310/332 X |
| 4,664,515 | 5/1987 | Imura et al. | 374/130 X |
| 4,684,804 | 8/1987 | Sodeikat | 250/351 X |
| 4,689,514 | 8/1987 | Kondoh et al. | 310/332 X |

Primary Examiner—Daniel M. Yasich
Attorney, Agent, or Firm—Price, Gess & Ubell

[57] ABSTRACT

A catoptric type radiation thermometer having a catoptric type optical system is provided with a light receiving member for receiving an infrared ray emitted from an object to be measured. The infrared ray is periodically prevented and allowed to pass by a shutter blade fixed to an optical chopper supported by a bimorph cell vibrated by an AC signal. The optical chopper is arranged in such a manner that the longitudinal direction thereof is perpendicular to an optical axis of the optical system and the transverse direction is parallel to the axis and that one end of the chopper is supported at the outside of the passageway of the infrared ray.

21 Claims, 7 Drawing Sheets

RADIATION THERMOMETER

This is a continuation of application Ser. No. 915,621, filed on Oct. 6, 1986, now abandon

BACKGROUND OF THE INVENTION

1. Field of the Invention

The present invention relates to a radiation thermometer for receiving infrared rays emitted from an object for measuring the temperature of the object.

2. Description of the Prior Art

Heretofore, optical systems in radiation thermometers for a low temperature region by receiving a 10μm-band infrared ray have been classified into a dioptic type and a catoptric type. The dioptric type of an optical system involves the problem of an increased cost because it is necessary to produce a lens from a special material capable of passing an infrared ray having a wavelength in a region used in the measurement. A further problem is that due to chromatic aberration it is impossible to completely image infrared rays of all the wavelengths contained in the region. In the above radiation thermometer, therefore, a catoptric type optical system has heretofore been used in many cases.

Figure 6:
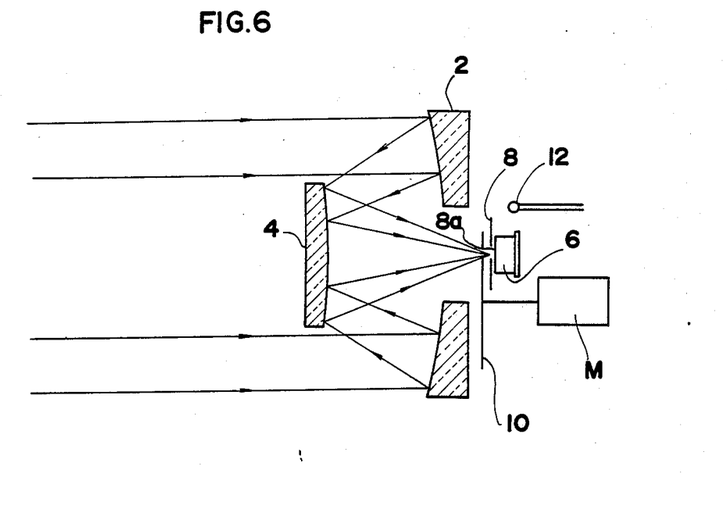
FIGS. 6 and 7 are sectional views of optical systems for conventional radiation thermometers.

In a Cassegrain type, one of the typical type of the catoptric type, optical system shown in FIG. 6, a portion of the light beam advancing from an object for measurement toward a concave mirror 2 is shielded by a convex mirror 4 because there is a convex mirror 4 in the optical path from the object to the concave mirror 2, thus making it difficult to obtain a bright optical system. In FIG. 6, a detector 6 is adapted to receive an infrared ray from the object for measurement. A pin-hole plate 8 includes a pin-hole 8a which defines a measuring region. A chopper 10 is driven by a motor M to shutter the incidence of light upon the detector 6 intermittently, and a thermosensitive device 12 for measuring the temperature of the detector 6 itself serves as a basic of measurement.

Figure 7:
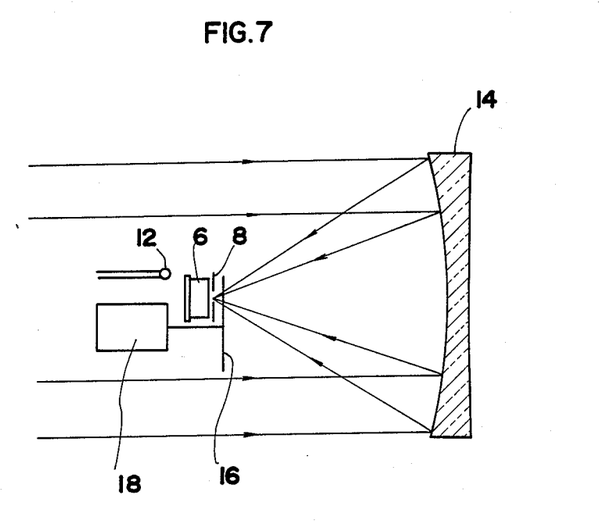

In another conventional catoptric type optical system shown in FIG. 7 a detector is disposed in place of the convex mirror used in the Cassegrain type optical system. In this case, although there is not provided a convex mirror which shields the Cassegrain type optical system, a chopper 16 is disposed in an optical path extending from the object to a concave mirror 14 and it shields the light beam largely in place of the convex mirror, resulting in the optical system becoming dark. Moreover a complicated structure results because the chopper 16 and a chopper driving motor 18 must be supported in the beam.

The present invention has been accomplished in order to remedy the above-mentioned drawbacks of the conventional optical system, and it is an object thereof to provide a radiation thermometer simple in structure and capable of affording a bright optical system.

It is another object of the present invention to provide an optical meter capable of making an accurate measurement.

SUMMARY OF THE INVENTION

For achieving the above-mentioned objects, the present invention employs a vibration plate or diaphragm constituted by a bimorph cell which generates flexural vibrations in the thickness direction upon application of AC voltage, as well as a shutter blade fixed to one end of the diaphragm, in place of a rotating chopper and a chopper driving motor which have heretofore been used for controlling light incident on a detector. The bimorph diaphragm is of a construction in which a shutter blade fixed to one end of the diaphragm is overlapped with a pin-hole so that its longitudinal direction is perpendicular to an optical axis and its transverse direction is parallel to the optical axis, and the end of the diaphragm on the side opposite to the shutter blade is supported outside the measurement light beam in the optical system.

Therefore, the bimorph diaphragm which constitute the chopper exposes only its thickness into the light beam travelling from an object for measurement to the concave mirror, and it is substantially only the detector that intercepts the light beam travelling toward the concave mirror, resulting in an optical system that can be made brighter to a large extent and the construction can be simplified.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
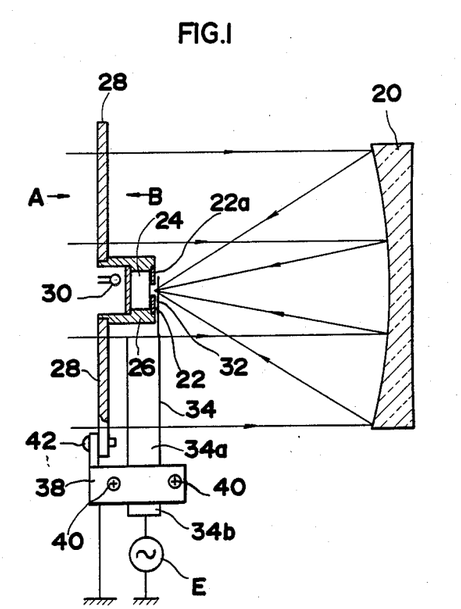
FIG. 1 is a sectional view of an optical system for a radiation thermometer according to an embodiment of the present invention.
Figure 2:
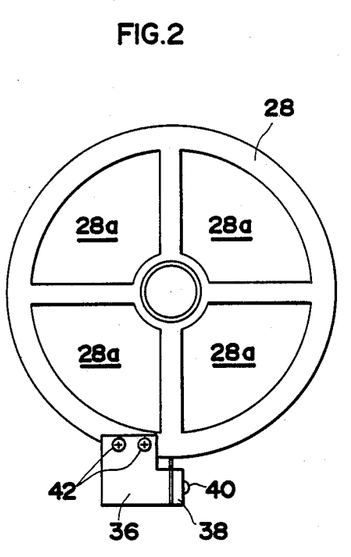
FIG. 2 is a front view as seen from A in FIG. 1.

An infrared ray from an object to be measured is reflected and focused by a concave mirror 20 in FIG. 1. A pin-hole plate 22 disposed at the focused position includes a pin-hole 22a for defining a measurement region. An infrared ray which has passed through the pin-hole 22a is detected by a detector 24 to provide a metered signal.

Both the detector 24 and the pin-hole plate 22 are mounted on a detector holder 26 which is supported by a support member 28 having a window 28a. A thermosensitive device 30 for measuring a temperature of the detector is arranged close to the detector.

Figure 3:
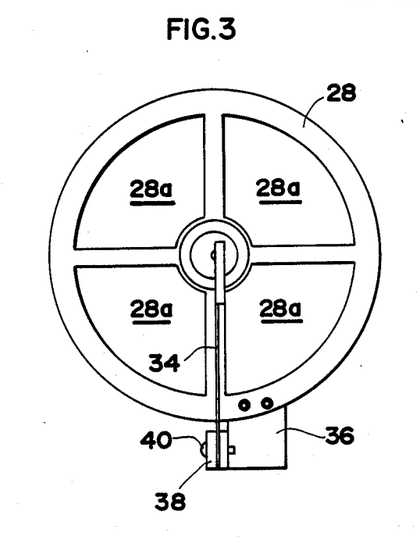
FIG. 3 is a rear view as seen from B in FIG. 1.

A chopper is constituted by a bimorph vibration plate or diaphragm 34 with a shutter blade 32 fixed to one end thereof. The shutter blade 32 is disposed in a position adjacent to the pin-hole 22a. The bimorph diaphragm 34 is disposed so that its transverse direction lies parallelly with an optical axis of the optical system and its longitudinal direction lies perpendicularly to the optical axis. The width of the bimorph diaphragm 34 is considerably greater than its thickness, and the thickness is positioned parallel to the optical axis of the optical system. The other end of the bimorph diaphragm is fixed outside the measurement light beam between two fixing members 36 and 38 through two bolts 40. The amount of displacement of the bimorph diaphragm 34 depends on the length of the diaphragm 34, and a length which affords an amount of displacement sufficient to open and close the pin-hole 22a is also obtained easily by the arrangement. The bimorph diaphragm 34 comprises the movable portion of the bimorph cell and has a thickness smaller than its width, as can be seen by reference to FIGS. 4 and 5. The extended width portion of the diaphragm 34 is aligned with the optical axis of the optical system to present a minimal profile that could block any infrared radiation. As can be seen from FIGS. 3 and 5, the thickness of the diaphragm 34 is less than the width of the shutter blade 32 than can vibrate across the pin-hole 22a.

Further, the fixing member 36 is fixed to the support member 28 with two bolts 42. An AC signal fed to the bimorph diaphragm 34 is applied from an AC source E to an electrode 34a through the fixing members 36 and 38 which are in contact with the electrode, and also to an electrode 34b directly.

In order to keep low the voltage applied to the bimorph diaphragm 34, it is desirable that the vibration required of the bimorph diaphragm be as small as possible. It is therefore desirable that the shutter blade 32 vibrate symmetrically with respect to the center of the pin-hole 22a, and it is necessary for it to be disposed adjacent to the pin-hole 22a. This can be attained by loosening the four bolts 40 and 42 and thereby adjusting the position of the shutter blade 32 relative to the pinhole 22a.

Figure 4:
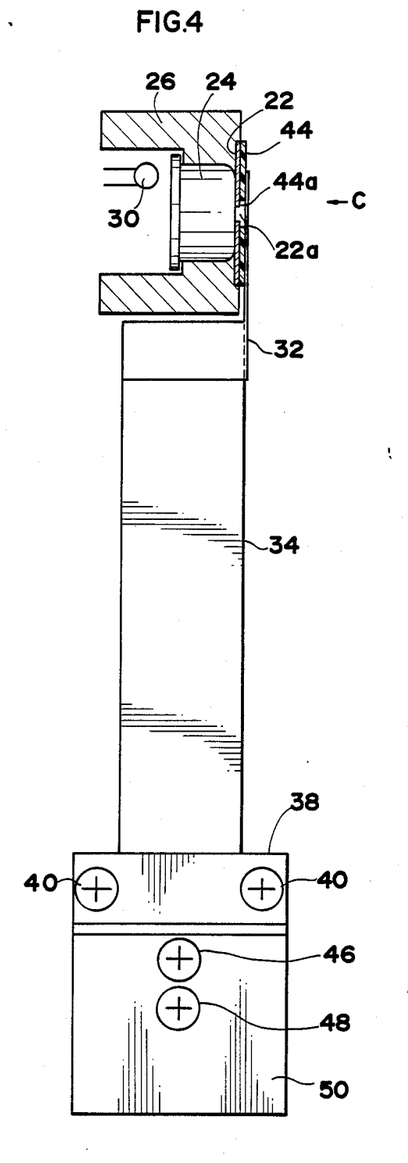
FIG. 4 is a sectional view showing a principal portion thereof.
Figure 5:
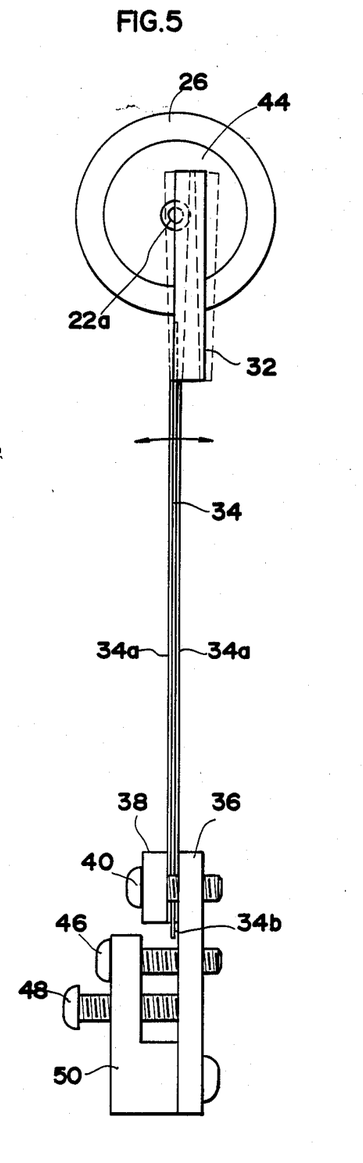
FIG. 5 is a front view as seen from C in FIG. 4.

An optimum construction for such adjustment of the chopper is shown in FIGS. 4 and 5. In these figures, the shutter blade 32 is constituted by a thin metallic plate having resilience, whereby a shim of the bimorph diaphragm 34 can be machined directly on that thin metallic plate. Onto the pin-hole plate 22 is fixed a thin plastic plate 44 so that an opening 44a is concentric with the pin-hole 22a, the thin plastic plate 44 being formed of a self lubricating polyethylene or fluoroplastic (flourine-contained polymers) for example. The position of the shutter blade 32 is adjusted so that the shutter blade contracts with the plastic plate 44 lightly. This adjustment is made by putting the bimorph diaphragm 34 between the fixing members 36 and 38 and tightening the bolts for fixing after completion of the adjustment to permit a light bias of the shutter blade 32 against the plate 44.

Under such construction, the spacing between the shutter blade 32 and the pin-hole 22a is held constant by the thickness of the plastic plate 44 interposed there between. Friction induced by the contact is negligible because of a very weak resilience of the shutter blade 32 and the self-lubricating property of the plastic plate 44. The fixing member 36 is fixed to a support base 50 with bolts 46 and 48, and the adjustment in lateral and vertical directions of the shutter blade 32 perpendicular to the optical axis is effected by the two bolts 46 and 48.

According to this embodiment, moreover, a fixed end supporting section composed of the above mentioned members 36, 38, 40, 46, 48, 50 for adjusting the relative position of the shutter blade 32 and the pin-hole 22a in a predetermined relation as well as a section for applying a drive signal to the bimorph diaphragm, are disposed outside the optical system, that is, these sections do not intercept the travelling of light beam, so that a bright optical system can be attained; besides, it is easy to adjust the position of the shutter blade 32 relative to the pin hole 22a.

FIGS. 8 to 12 illustrate a second embodiment and a modification thereof of the present invention in which, a radiation thermometer having the same construction as that in the above first embodiment is arranged to prevent a bimorph vibration plate or diaphragm from being deflected by gravity which causes the occurrence of a measurement error when the radiation thermometer is held in an inclined state. When the bimorph is vertical (i.e. in a reference position), there is no influence of gravity, but when it is offset towards a horizontal direction or an inclined state to the vertical plane, a central position of the chopper vibration deviates from that in a vertical state of the bimorph due to a gravity-deflection of the bimorph. If this deviation is detected and the voltage to be applied to the bimorph is adjusted in accordance with the results of the detection, then no matter in which direction the measuring apparatus may be located, a change of deflection of the bimorph caused by a change of posture thereof is corrected automatically, thus always affording a correct measured value.

The details of construction and the optical system used are the same as in the first embodiment so an explanation theron will be omitted.

Figure 8:
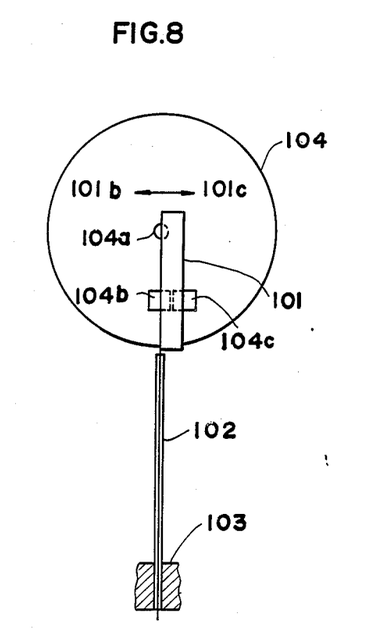
FIG. 8 is a front view of an optical system according to a second embodiment of the present invention.

In FIG. 8, a light chopper 101 is attached to an upper end of a bimorph 102. A lower end of the bimorph 102 is fixed to a base 103, while the upper end thereof is composed as a free end adapted to deflect in a lateral direction perpendicular to an optical axis, which deflection causes the chopper 101 to be displaced in the directions of arrows 101b and 101c. A light restriction plate 104 includes a central opening 104a. When the chopper 101 covers this opening, light from an object to be measured is prevented from passing through the opening, while when the chopper 101 retreats from the opening 104a, light is allowed to pass through the opening.

Figure 9:
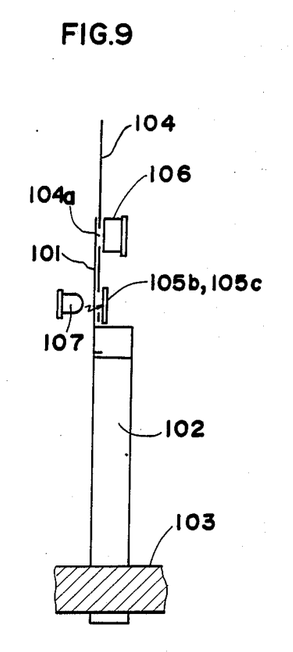
FIG. 9 is a side views thereof.

Referring now to FIG. 9, there is illustrated this embodiment in a side view, in which light passes through the opening 104a of the light restriction plate 104 from the left-hand side. In a radiation thermometer according to this embodiment, which measures infrared rays from an object to be measured photometrically, an infrared ray sensor 106 is disposed just behind the opening 104a. The light chopper 101 is disposed in a position adjacent to the light restriction plate 104 in front of the same plate.

As the above system is tilted right- or leftwards in FIG. 8, the bimorph 102 is deflected by its own weight and the weight of the chopper 101. When the bimorph 102 is in a vertical position as a reference position as shown in the figure, the chopper 101 shields just half the opening 104a of the light restriction plate 104 in a non-applied state of voltage to the bimorph 102. Centered on this position, the chopper 101 is deflected right and left to equalize the intermittent ratio of light passing with respect to time.

In this embodiment, as means for detecting a gravity-displacement of the chopper 101, two openings 104b and 104c are arranged side by side below the opening 104a of the light restriction plate 104 so that in the reference position the two openings are shielded by only half of the respective areas by means of the chopper 101; further, as shown in FIG. 9, a light emitting diode 107 as a light source is disposed in front of the chopper 101, and photo diodes 105b and 105c as light detecting elements are disposed just behind the openings 104b and 104c. In this construction, when the chopper 101 does not vibrate, the same quantity of light is incident on the photo diodes 105b and 105c, and the output of both diodes are equal to each other. If the chopper 101 is vibrated in this state, the photo diodes 105b and 105c will provide AC signals of equal amplitude at the same frequency. As the system in inclined, the chopper 101 is deflected to either the right or the left by gravity. For example, upon deflection to the righ, the output of the photo diode 105b increases and that of the photo diode 105c decreases. If the chopper 101 is vibrated in this state, there will be provided from the photo diodes 105b and 105c AC signals with DC components added thereto which DC components corresponded to such increment and decrement of output. The difference between the DC compenents in the output signals of the photo diodes 105b and 105c corresponds to a detected signal indicative of the gravity-deflection of the chopper 101. The detected signal is converted to a DC voltage, which, after amplified, is applied to the bimorph 102, causing the bimorph to produce a deflection force in a direction opposite to the gravity-deflection to correct the deviation.

Figure 10:
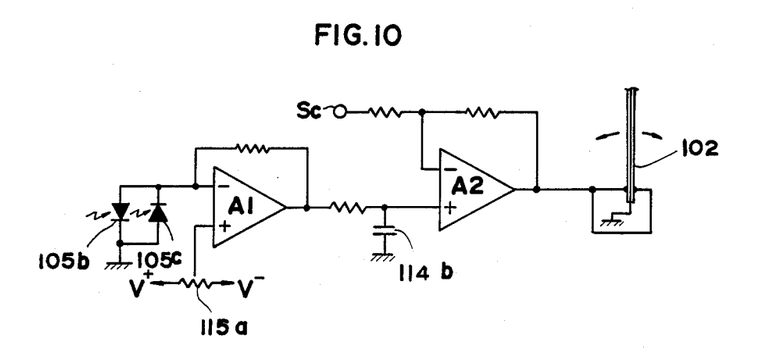
FIG. 10 is a circuit diagram of a deflection correcting section utilizing gravity in the second embodiment.

Referring now to FIG. 10, there is illustrated a circuit for making the above correction, in which the photo diodes 105b and 105c, coupled differentially, are connected to an inversion terminal of a differential amplifier A1. The openings 104b and 104c of the light restriction plate are contrary to each other in the increase and decrease of shielding by the chopper 101, so the AC signals provided from the photo diodes 105b and 105c are out of phase with each other by a half period. Consequently, at an output provided in a differential connection of the photo diodes 105b and 105c, AC components are offset and the difference between DC components is input to the differential amplifier A1. A non-inversion terminal of the differential amplifier A1 is connected to a slider of a potentiometer 115a. In the foregoing reference position, the DC components in the outputs of the photo diodes 105b and 105c are basically equal to each other and the inputs at the inversion terminal of the differential amplifier A1 is zero, so the input at the non-inversion terminal may be held zero. Actually, however, the difference between the DC components in the outputs of the photo diodes 105b and 105c is not zero due to the difference in the characteristics between both photo diodes or a profile error of the openings 104b and 104c. Therefore, the potentiometer 115a is adjusted in advance so that the output of the differential amplifier A1 becomes zero in the reference position. Thus, the output of the differential amplifier A1 corresponds to the difference between DC components based on a gravity-deflection of the chopper 101 in the outputs of the photo diodes 105b and 105c, and this difference is input to a non-inversion terminal of an amplifier A2. To the inversion terminal of the amplifier A2 is input from a terminal Sc an AC signal for driving the chopper 101, and the output of the amplifier A2 is applied to the bimorph 102. Assuming that the input at the terminal Sc is zero, the output voltage of the differential amplifier A is applied to the bimorph 102 directly. The output side of the amplifier A2 is connected to a terminal of the bimorph 102 so that the polarity of such applied voltage caused the bimorhp 102 to deflect in a direction opposite to the gravity-deflection. Therefore, the gravity-deflection of the bimorph 102 is corrected by the output of the amplifier A2 provided the gain of the amplifier Al is made sufficiently large. The bimorph driving AC signal which is input to the terminal Sc, is directly inverted by the amplifier A2 and applied to the bimorph 102, so that the chopper 101 vibrates while maintaining its normal position even under the influence of gravity. The AC components in the outputs of the photo diodes 105b and 105c are not completely of the same amplitude due to a dimensional error of the openings 104b and 104c scattering in characteristics of the photo diodes 105b and 105c, resulting in the AC components somewhat remaining in the output of the differential amplifier A1, which should be absorbed to allow only an DC component to be fed to the amplifier A2. To this end there is provided a capacitor 114b.

Figure 11:
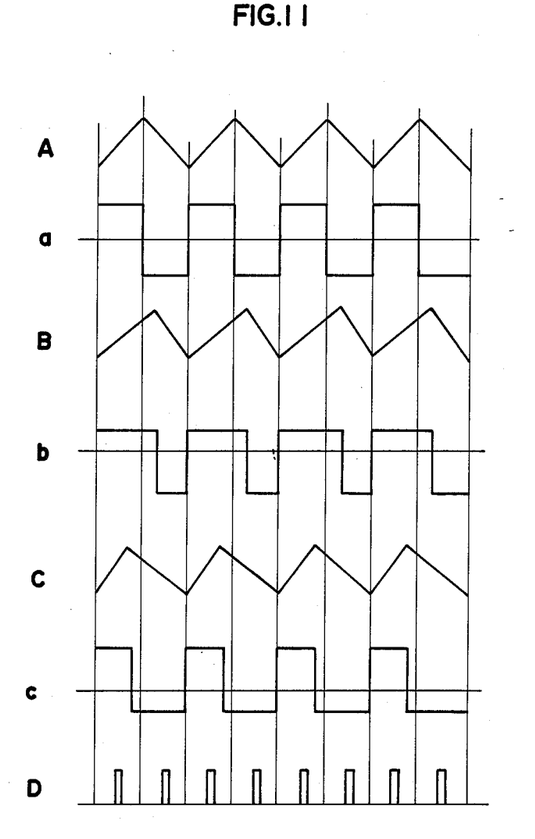
FIG. 11 is a signal waveform diagram explaining the operation principles of a modification of the second embodiment.
Figure 12:
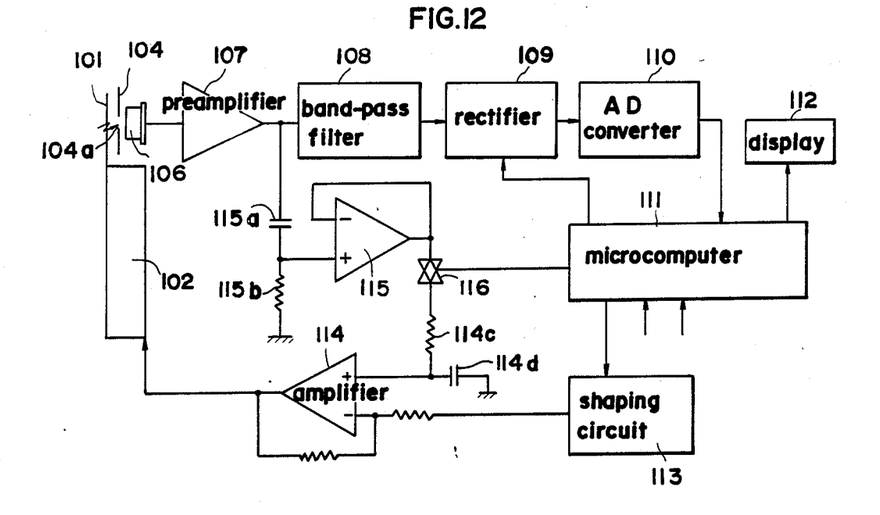
FIG. 12 is a circuit diagram of a signal processing section in the above modification.

Referring now to FIGS. 11 and 12, there is illustrated a modified embodiment, in which a gravity-deflection of the chopper 101 is detected by the output of the infrared ray sensor in FIG. 8. Therefore, there may be adopted the same construction as in FIGS. 8 and 9 except that the light restriction plate 104 is not provided with the openings 104b and 104c and the photo diodes 105b and 105c are not used. In this modification, the infrared ray sensor 106 is a thermal type which converts a rise in temperature of the device after the receipt of light for a predetermined time into an electric signal. Thus, it is a kind of an integral type sensor. FIG. 11 shows how the output waveform of a sensor in a radiation thermometer of this type changes according to an intermittent duty ration in the light passing (time ratio of exposed and shielded periods). In FIG. 11, A, B and C represent the cases where the duty ratio is 1, the exposed period is longer at the same cycle, and the shielded period is longer, respectively. During exposure, the device temperature rises linearly in proportion to the intensity of incident light in a region located away from saturation temperature, thus causing a linear increase of the output signal as well. On the other hand, during the light-shielded period, the device temperature drops linearly, so the output signal attenuates and becomes a trianigular wave signal. Removal of only the DC component from this triangular wave signal would merely afford a triangular wave signal having equal positive and negative deflection widths. After differentiation, however, in the case of FIG. 11-A, both rising and falling periods of the triangular wave are equal in length, so the differentiated waveform is a rectangular wave having equal upper and lower deflection widths as shown in FIG. 11-A. Likewise, in the case of FIG. 11-B, the rising period is longer than the falling period, so there is obtained a rectangular wave having a smaller pulse height on the positive side and a larger pulse height on the negative side as shown in FIG. 11-b. Conversely, in the case of FIG. 11-C, there is obtained a rectangular wave having larger and smaller pulse heights on the positive and negative sides, respectively, as shown in FIG. 11-c. Consequently, the difference between the amplitude on the positive side and that on the negative side of the differentiated waveform provided from the photo detector is obtained as a detected signal indicative of a deviation of the light chopper. Therefore, this signal is converted to a voltage signal, which is fed back to the bimorph in a direction cancelling the gravity-deflection.

Referring now to FIG. 12, there is illustrated a circuit configuration of this embodiment, in which a light chopper 101, a bimorph 102, a light restriction plate 104, an opening 104a, and a photo sensor 106 are provided. These components are of the same structures as in FIG. 1. An output of the sensor is received by a microcomputer 111 through a pre-amplifier 107, a band pass filter 108, a full-wave rectifier 109 and an A/D converter 110, whereby it is converted to a temperature representing signal, which is provided to a display means 112. On the other hand, an output of the pre-amplifier 107 is differentiated in a differentiation circuit consisting of a capacitor 115a and a resistor 115b, and a differentiated output is fed to an amplifier 115. An output of the amplifier 115 is sampled by a switching device 116 and smoothed in an intergrating circuit consisting of a resistor 114c and a capacitor 114d. To the switching device 116 is applied a sampling signal shown in FIG. 11-D from the microcomputer 111, and a differentiated signal of the sensor output such as that shown in FIG. 11-a, b or c is sampled with respect to both positive and negative amplitudes. Since the positive and negative amplitudes thus sampled are smoothed, the resulting smoothed signal corresponds to the difference between the positive and negative deflection widths of a signal such as that shown in FIG. 11-a, b or c. This difference signal is applied to an non-inversion terminal of an output amplifier 114, which in turn provides an output signal to the bimorph 102 to correct the gravity-deflection of the bimorph. To an inversion terminal of the output amplifier 114 is applied a bimorph driving signal from the microcomputer 111 through a waveform shaping circuit 113. The function of the output amplifier 114 is just the same as that of the amplifier A2 used in the above embodiment.

Figure 13:
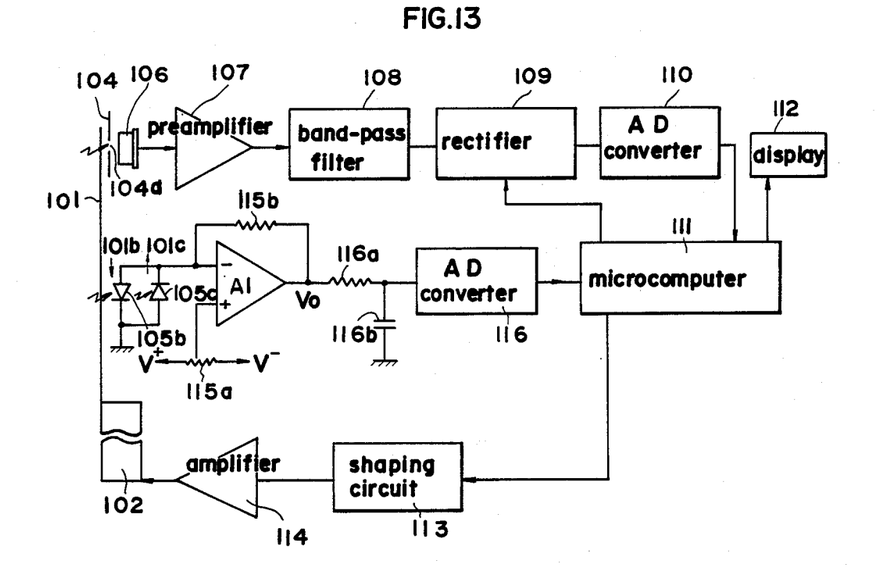
FIG. 13 is a circuit diagram of a signal processing section in a third embodiment of the present invention.
Figure 14:
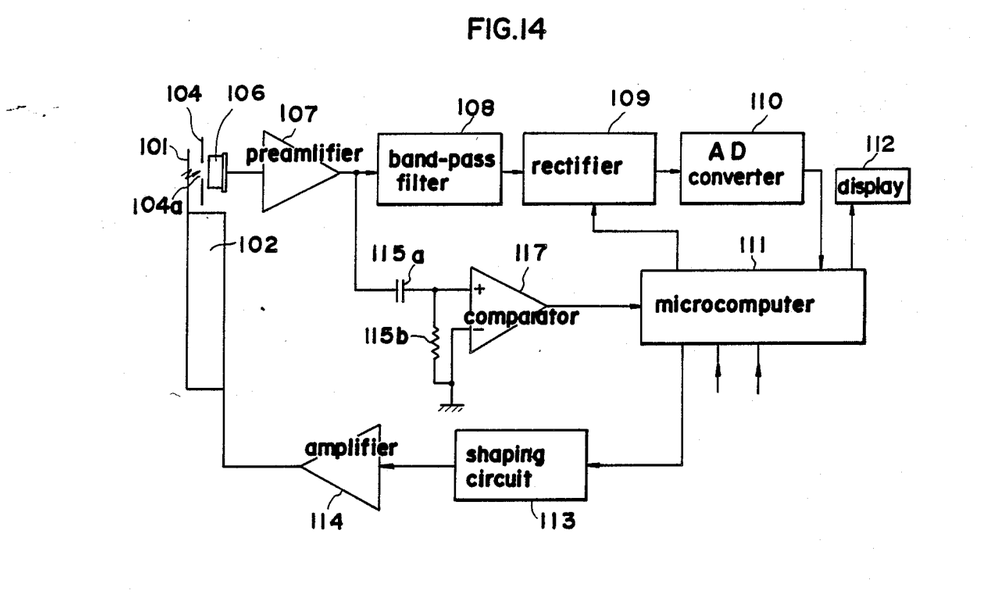
FIG. 14 is a circuit diagram of a signal processing section in a modification of the third embodiment.

Referring now to FIGS. 13 and 14, there are illustrated a third embodiment and a modification thereof the present invention which, like the above embodiment, is constructed to prevent the occurence of a measurement error when a radiation thermometer is held in an inclined state. In the above embodiment the deflection of the bimorph is adjusted by varying the voltage applied to the bimorph to thereby prevent a measurement error, while in this embodiment a measurement error is prevented by performing a correcting operation for measured values. A light chopper 101 and other components used in this embodiment are of the same construction as in FIGS. 8 and 9, so an explanation thereon will be omitted.

In the system shown in FIGS. 8 and 9, as previously noted, when the system is inclined, the chopper 101 is deflected by gravity to either the right or the left. For example, upon inclination to the right, the output of the photo diode 105b increases and that of 105c decreases, and if the chopper 101 is vibrated in this state, there will be provided from the photo diodes 105b and 105c AC signals with DC components added thereto which DC component correspond to such increment and decrement of output.

Thus, the difference between the DC components in the output signals of the photo diodes 105b and 105c corresponds to a detected signal indicative of a gravity-deviation of the chopper 101. This detected signal is fed to an AD converter 116, and a digitized deviation data obtained by the AD converter 116 is fed to the microcomputer 111 together with measured data obtained by the infrared ray sensor 106. Then, in the microcomputer 111, the deviation is converted to a correction data for correcting the measured data by using a conversion formula or conversion table obtained in advance by a calibrated measurement, and the measured data is corrected to an exact detection value on the basis of the correction data (i.e. deviation data) and the measured data.

FIG. 13 illustrates a concrete circuit configuration including a circuit for generating the above-mentioned deviation data. With this construction, there are provided a light chopper 101, a bimorph 102, a light restriction plate 104, an opening 104a, and a photo sensor 106. An output of the sensor 106 is received by the microcomputer 111 through pre-amplifier 107, band pass filter 108, full-wave rectifier 109 and A/D converter 110, whereby it is converted to the numerical value corresponding to temperature of an object and then provided to a display means 112. The photo diodes 105b and 105c, coupled differentially, are connected to an inversion terminal of a differential amplifier A1. Openings 104b and 104c in the light restriction plate 104 are contrary to each other in the increase and decrease of the amount of shielding by the chopper 101, so the AC signals provided from the photo diodes 105b and 105c are out of phase with each other by a half period. Consequently, a signal comprising the AC component and the difference between the DC components added thereto is fed to the differential amplifier A1. A non-inversion terminal of the differential amplifier A1 is connected to a slider of a potentiometer 115a. When the bimorph 102 is in the foregoing reference position, the DC components in the outputs of the photo diodes 105b and 105c are basically equal to each other and the input at the inversion terminal of the differential amplifier A1 is zero, so the input at the non-inversion terminal may be held zero. Actually, however, the difference between the DC components in the outputs of the photo diode 105b and 105c is not zer due to the difference in characteristics between both photo diodes or a profile error of the openings 104b and 104c. Therefore,the potentiometer 115a is adjusted in advance so that the output of the differential amplifier A1 becomes zero in the reference position. Thus, the average of the output signals provided from the differential amplifier A1 corresponds to the difference between DC components based on the gravity-deviation of the chopper 101 at the outputs of the photo diodes 105b and 105c. This difference signal is fed to an AD converter 116, and the deviation data digitized by the AD converter 116 is input to the microcomputer 111. A capacitor 116b is provided for averaging the outputs of the output signals of the differential amplifier A1, and providing the signal to the AD converter 116.

In a modified embodiment, a gravity-deflection of the chopper 101 is detected by the output of the infrared ray sensor 106 shown in FIG. 8. Therefore, there may be adopted the same construction as in FIGS. 8 and 9 except that the light restriction plate 104 is not provided with the openings 104b and 104c and the photo diodes 105b and 105c are not used. For this reason, structural diagram and structural explanation of this embodiment will be omitted. In this embodiment, the infrared ray sensor 106 is a thermal type which converts a rise in temperature of the device after the receipt of light for a predetermined time into an electric signal. Thus, it is a kind of an integral type sensor. The output waveform of a sensor changes according to an intermittent duty ratio in the light passing (time ratio of exposed and shielded periods) in the same way as in FIGS. 11-A, a, B, b, C, c. Therefore, the difference between the positive and negative side time widths of the differentiated waveform output of the photo sensor corresponds to a detected signal indicative of a light chopper deviator, and so in accordance with this signal the computer makes correction of the measured data.

FIG. 14 illustrates a circuit configuration of the above modification, in which there are provided a light chopper 101, a bimorph 102, a light restriction plate 104, an opening 104a, and a photo sensor 106. An output of the sensor 106 is received by a microcomputer 111 through pre-amplifier 107, band pass filter 108, full-wave rectifier 109 and A/D converter 110, whereby it is converted to the numerical value corresponding to a temperature of an object and fed to a display means 112. On the other hand, an output of the pre-amplifier 107 is differentiated in a differentiation circuit consisting of a capacitor 115a and a resistor 115b, and the resulting differentiated output is fed to a comparator 117. When this input signal voltage is positive, the comparator 117 provides a logical signal "1" to the microcomputer 111, while when it is negative, the comparator provides a logical signal "0" to the microcomputere. In the microcomputer 111, clock pulses of a period shorter than the operation period of the light chopper are counted only during the period during which the signed fed from the comparator 117 is "1" and this count value is compared with a reference value. This operation is performed at every operation period of the light chopper. The difference between the count value and the reference value corresponds to data indicative of a deviation of the light chopper. The method of correcting measured data using such deviation data is just the same as in the above third embodiment.

The above second and third embodiments and the modifications thereof have the advantage that the photometric apparatus can be used in a free posture without requiring any manual adjustment because the influence of gravity is adjusted automatically.

What is claimed is:

1. An optical chopper assembly for use in a radiation thermometer, comprising:
   an optical system for directing infrared rays emitted from an object to be measured;
   means for receiving said infrared rays to produce an electric signal corresponding to the received infrared rays;
   processing means for receiving said signal from said receiving means for calculating the temperature of said object;
   an optical chopper including a bimorph supported at its one end and having a shim electrode formed of an elastic thin metal plate and having a pair of outward electrodes holding said shim electrode therebetween and said chopper further including a shutter blade formed at another end of said bimorph of said metal plate without said outward electrodes, said shutter blade being arranged in front of said receiving means, and
   control means for supplying an AC signal to said bimorph for causing the same to vibrate in a predetermined path so that said shutter blade alternatively prevents and allows passage of said infrared rays to said receiving means.

2. An optical chopper assembly as claimed in claim 1, further including means for detecting any degree of deviation of said shutter blade from its predetermined path caused by a temperature change and for correcting any resulting error.

3. A radiation thermometer, comprising:
   a catoptric optical system having an optical axis and including a focusing concave mirror for reflecting an infrared ray emitted from an object;
   a light receiving member arranged in a focal plane of said focusing concave mirror for receiving said infrared ray reflected by said mirror;
   a shutter blade;
   a bimorph cell having a thickness smaller than its width and smaller than that of said shutter blade, said bimorph cell supported at its one end at a position outside of the passageway of said infrared ray as defined by said catoptric optical system in such a manner that the direction of the thickness of the bimorph cell is parallel to said optical axis of said catoptric optical system, said bimorph cell supporting said shutter blade on another end of the bimorph cell, thereby permitting said shutter blade to extend into the passageway of said reflected infrared ray, and
   a control circuit for supplying an AC signal to said bimorph cell for causing the bimorph cell to vibrate in a predetermined movement so that said shutter blade alternatively prevents and allows the passage of said reflected infrared ray from said focusing concave mirror to said light receiving member intermittently.

4. A radiation thermometer as stated in claim 3, further comprising:
   means for detecting a degree of deviation of the vibrating shutter blade from said predetermined movement of said bimorph cell, caused by said gravity, and producing a representative detecting signal;
   means for changing said detecting signal to a DC voltage signal, and
   means for supplying said DC voltage signal as a correcting signal to said bimorph cell for correcting the offsetting deviation of said bimorph cell caused by gravity.

5. A radiation thermometer as stated in claim 3, further comprising:
   a restricting member arranged in said passageway of said reflected ray and close to said shutter blade for allowing a passage of the reflected ray only from an object in a predetermined region to be measured, and
   an intermediate member made of a self-lubricating plastic and arranged between said restricting member and said shutter blade while being in contact with the shutter blade, the bimorph cell biasing said shutter blade against said intermediate member.

6. An optical chopper assembly for use in an optical meter, comprising:
   a light receiver for receiving light emitted from an object to be measured;
   a chopper movably supported for periodically preventing and allowing a passage of said light;
   a supporting member made by a bimorph member for movably supporting said chopper;
   means for supplying an AC signal to said supporting member for causing the same to vibrate in a predetermined motion;

means for detecting any deviation of said chopper caused by gravity from the predetermined motion and generating a detecting signal;

means for changing said detecting signal to a DC voltage signal, and means for supplying said DC voltage signal as a correcting signal to said supporting member for offsetting said deviation of said supporting member caused by gravity.

7. An optical chopper assembly as stated in claim 6 wherein said detecting means includes said light receiver and said correcting signal corresponds to a difference between the generating power of said light receiver when the chopper is deviated and when the chopper is not deviated by gravity.

8. An optical chopper assembly as stated in claim 6 wherein said detecting means comprises a light emitter and a second light receiver arranged in relative opposite positions relative to a normal vertical position of the chopper, and said correcting signal corresponds to a difference between the generating power of said second light receiver when the chopper is deviated and when the chopper is not deviated by gravity.

9. An optical chopper assembly as stated in claim 8 wherein said second light receiver is composed of a pair of light receiving members capable of generating the same magnitude of power of signals when the chopper is not deviated, and said generating power of said second light receiver corresponds to a difference between the generating powers of said light receiving members.

10. A radiation thermometer, comprising:

a catoptric optical system having an optical axis and including a focusing concave mirror for reflecting an infrared ray emitted from an object;

a light receiving member arranged in a focal plane of said focusing concave mirror for receiving the infrared ray reflected by said mirror;

an optical chopper assembly including a bimorph cell having a thickness smaller than its width and supporting one of its ends at a position outside of the passageway of said infrared ray in such a manner that the direction of the thickness of the bimorph cell is parallel to the optical axis of said optical system and a shutter blande having a thickness larger than that of said bimorph cell and operatively attached to the bimorph cell for movement into and out of the passageway of said infrared ray, and a control circuit for supplying an AC signal to said bimorph cell for causing the bimorph cell to vibrate in a predetermined motion so that said shutter blade alternatively prevents and allows a passage of said reflected infrared ray from said focusing concave mirror to said light receiving member intermittently.

11. A radiation thermometer as stated in claim 10, further comprising:

a restricting member arranged in said passageway of said reflected ray and close to said shutter blade for allowing a passage of the reflected ray only from an object in a predetermined region to be measured, and an intermediate member made of a selflubricating plastic and arranged between said restricting member and said shutter blade while being in contact with the shutter blade.

12. A radiation thermometer as stated in claim 11, further comprising:

means for detecting a degree of deviation of the vibrating shutter blade from said predetermined motion of said bimorph cell caused by gravity and producing a representative detecting signal;

means for changing said detecting signal to a DC voltage signal, and means for supplying said DC voltage signal as a correcting signal to said bimorph cell for correcting the offsetting deviation of said bimorph cell caused by gravity.

13. An optical chopper assembly for use in an optical metering system, comprising:

an optical system for condensing an infrared ray emitted from an object to be measured;

means for metering said infrared ray and producing a metered signal;

an optical chopper having a bimorph cell for preventing and allowing a passage of said infrared ray;

means for detecting a degree of deviation of said optical chopper caused by gravity to generate a detecting signal, and means for correcting said metered signal with the detecting signal, thereby providing a corrected signal by eliminating an error caused by said gravity deviation.

14. A radiation thermometer, comprising:

an optical system for directing infrared rays emitted from an object to be measured;

means for receiving said infrared rays to produce an electric signal corresponding to the received infrared rays;

means for receiving said signal from said receiving means and for calculating the temperature of said object;

vibration means including a bimorph member that can be vibrated for preventin and allowing a passage of said infrared ray to said receiving means intermittently;

control means for supplying an AC signal to said bimorph for causing the same to vibrate in a predetermined path along a vertical plane, and means for detecting any degree of inclination of said vibration means from its predetermined vertical path caused by gravity and for correcting any resulting error in the measured temperature.

15. An optical chopper assembly for use in an optical meter, comprising:

a light receiver for receiving light emitted from an object to be measured and for generating a measuring signal;

a chopper movable between first and second positions for preventing and allowing a passage of said light respectively;

means for supporting said chopper and for driving said chopper between said first and said second positions alternately;

an electrical power source for enabling the driving of said supporting means;

means for detecting a degree of deviation of the movement of said chopper caused by gravity to generate a detecting signal, and means, responsive to said detecting signal, for correcting said measuring signal to a value which eliminates the effect of the deviation value caused by said deviation of said chopper.

16. An optical chopper assembly as stated in claim 15, wherein said correcting means further stores a relationship between predetermined values of said detecting signals and that of said deviation values.

17. An optical chopper assembly as stated in claim 15 wherein said detecting means is composed of said light receiver and said detecting signal corresponds to a difference of generating power of said light receiver when the chopper is deviated and when the chopper is not deviated during its movement.

18. An optical chopper assembly as stated in claim 15 wherein the supporting means includes a bimorph support for the chopper and the detecting means includes a light source, a pair of apertures in the chopper, and a pair of transducers for measuring the light passing through the apertures and generating a detecting signal proportional to the measured light through the apertures.

19. An optical chopper assembly as stated in claim 15 wherein said detecting means comprises a light emitter and a second light receiver arranged in opposite positions relative to the chopper.

20. An optical chopper assembly as stated in claim 19 wherein said second light receiver is composed of a pair of light receiving members and said detecting signal corresponds to a difference between the generating powers of the light receiving members.

21. An optical chopper assembly for use in an optical metering system, comprising:
  means for metering a light emitted from an object to be measured, and producing a metered signal;
  an optical chopper assembly that is moved periodically for preventing and allowing a passage of said light;
  means for detecting deviation of said optical chopper caused by gravity and generating a corresponding detecting signal, and
  means for correcting, in response to the detecting signal, said metered signal, thereby providing a corrected metered signal by eliminating the error caused by said deviation.

* * * * *